United States Patent
Larson et al.

(10) Patent No.: US 10,661,913 B2
(45) Date of Patent: May 26, 2020

(54) HYBRID RAM AIR TURBINE WITH IN-LINE HYDRAULIC PUMP AND GENERATOR

(71) Applicant: Hamilton Sundstrand Corporation, Charlotte, NC (US)

(72) Inventors: Michael E. Larson, Rockford, IL (US); William E. Seidel, Rockford, IL (US); Scott J. Marks, Oregon, IL (US); Timothy Scott Konicek, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 33 days.

(21) Appl. No.: 15/966,504

(22) Filed: Apr. 30, 2018

(65) Prior Publication Data

US 2019/0329900 A1  Oct. 31, 2019

(51) Int. Cl.
| | | |
|---|---|---|
| *B64D 41/00* | (2006.01) | |
| *H02K 7/116* | (2006.01) | |
| *H02K 7/14* | (2006.01) | |
| *H02K 7/18* | (2006.01) | |
| *F16H 3/44* | (2006.01) | |

(52) U.S. Cl.
CPC ........... *B64D 41/007* (2013.01); *H02K 7/116* (2013.01); *H02K 7/14* (2013.01); *H02K 7/183* (2013.01); *F16H 3/44* (2013.01)

(58) Field of Classification Search
USPC ............. 290/44, 55; 244/58; 416/142, 170 R
See application file for complete search history.

(56) References Cited

U.S. PATENT DOCUMENTS

| | | | | |
|---|---|---|---|---|
| 3,446,093 A | * | 5/1969 | Orshansky, Jr. ........ | F16H 47/04 475/78 |
| 3,455,183 A | * | 7/1969 | Orshansky, Jr. ........ | F16H 47/04 475/78 |
| 3,503,278 A | * | 3/1970 | Livezey ................... | B60K 5/08 74/661 |
| 4,134,310 A | * | 1/1979 | Orshansky, Jr. ........ | F16H 47/04 475/32 |
| 4,676,458 A | * | 6/1987 | Cohen .................. | B64D 41/007 244/58 |
| 4,717,095 A | * | 1/1988 | Cohen .................. | B64D 41/007 244/58 |
| 4,742,976 A | * | 5/1988 | Cohen .................. | B64D 41/007 244/58 |

(Continued)

FOREIGN PATENT DOCUMENTS

| | | |
|---|---|---|
| CN | 107128495 | 9/2017 |
| EP | 0712996 | 5/1996 |

OTHER PUBLICATIONS

European Search Report for EP Application No. 19171810.5 dated Aug. 22, 2019.

*Primary Examiner* — Pedro J Cuevas
(74) *Attorney, Agent, or Firm* — Carlson, Gaskey & Olds, P.C.

(57) ABSTRACT

A hybrid ram air turbine assembly includes a turbine portion having a plurality of turbine blades connected to a turbine shaft via a hub. A pivot joint is connected to the turbine portion by a hydraulic pump and an electric generator. The hydraulic pump and the electric generator are in-line with each other, and the turbine shaft is connected to a generator input shaft via a first gear set.

14 Claims, 3 Drawing Sheets

(56) References Cited

U.S. PATENT DOCUMENTS

| | | | | |
|---|---|---|---|---|
| 4,991,796 A * | 2/1991 | Peters | B64D 41/007 | 244/58 |
| 5,004,084 A * | 4/1991 | Mehr-Ayin | F16D 48/066 | 192/103 F |
| 5,145,324 A * | 9/1992 | Dickes | B64D 41/007 | 417/222.1 |
| 5,174,719 A * | 12/1992 | Walsh | B64D 41/007 | 184/6.11 |
| 5,249,924 A * | 10/1993 | Brum | B64D 39/00 | 416/48 |
| 5,398,780 A * | 3/1995 | Althof | B64D 41/007 | 185/39 |
| 5,484,120 A * | 1/1996 | Blakeley | B64D 41/007 | 244/54 |
| 5,487,645 A * | 1/1996 | Eccles | B64D 41/007 | 416/50 |
| 5,564,903 A * | 10/1996 | Eccles | F01D 25/164 | 416/174 |
| 5,820,074 A * | 10/1998 | Trommer | B64D 41/007 | 244/58 |
| 6,331,099 B1 * | 12/2001 | Eccles | B64D 41/007 | 416/142 |
| 6,676,379 B2 * | 1/2004 | Eccles | B64D 41/007 | 416/170 R |
| 7,077,631 B2 * | 7/2006 | Eccles | B64D 41/007 | 416/170 R |
| 7,416,392 B2 * | 8/2008 | Russ | B64D 41/007 | 416/142 |
| 8,622,697 B2 * | 1/2014 | Bortoli | B64D 41/007 | 416/1 |
| 8,640,563 B2 * | 2/2014 | Lang | B64D 41/007 | 74/89.39 |
| 8,641,379 B2 * | 2/2014 | Russ | B64D 41/007 | 416/142 |
| 8,651,815 B2 * | 2/2014 | Russ | B64D 41/007 | 416/143 |
| 8,777,587 B2 * | 7/2014 | Russ | B64D 41/007 | 417/229 |
| 8,876,474 B2 * | 11/2014 | Russ | B64D 41/007 | 416/46 |
| 8,931,734 B2 * | 1/2015 | Russ | B64D 41/007 | 244/58 |
| 8,970,059 B2 * | 3/2015 | Russ | H02K 5/06 | 290/52 |
| 9,028,990 B2 * | 5/2015 | Gans | B64D 41/007 | 429/428 |
| 9,108,742 B2 * | 8/2015 | Russ | B64D 41/007 | |
| 9,188,105 B2 * | 11/2015 | Bortoli | B64D 41/007 | |
| 9,205,928 B2 * | 12/2015 | Russ | B64D 41/007 | |
| 9,211,958 B2 * | 12/2015 | Russ | B64D 41/007 | |
| 9,238,972 B2 * | 1/2016 | Russ | F01B 15/08 | |
| 9,296,487 B2 | 3/2016 | Larson | | |
| 9,399,522 B2 * | 7/2016 | Bannon | F15B 15/261 | |
| 9,415,880 B2 * | 8/2016 | Russ | B64D 41/007 | |
| 9,511,875 B2 * | 12/2016 | Sasscer | B64D 41/007 | |
| 9,656,763 B2 * | 5/2017 | Bannon | F15B 15/14 | |
| 9,719,367 B2 * | 8/2017 | Russ | F01D 15/08 | |
| 9,878,800 B2 | 1/2018 | Russ et al. | | |
| 9,970,526 B1 * | 5/2018 | Bortoli | C22C 38/06 | |
| 10,077,118 B2 * | 9/2018 | Bortoli | B64D 41/007 | |
| 2003/0108426 A1 * | 6/2003 | Eccles | B64D 41/007 | 416/170 R |
| 2005/0129517 A1 * | 6/2005 | Eccles | B64D 41/007 | 416/170 R |
| 2011/0229309 A1 * | 9/2011 | Russ | B64D 41/007 | 415/126 |
| 2011/0229342 A1 * | 9/2011 | Russ | B64D 41/007 | 416/246 |
| 2011/0236218 A1 * | 9/2011 | Russ | B64D 41/007 | 416/246 |
| 2012/0011953 A1 * | 1/2012 | Bortoli | B64D 41/007 | 74/412 R |
| 2012/0128495 A1 * | 5/2012 | Bortoli | B64D 41/007 | 416/170 R |
| 2012/0183402 A1 * | 7/2012 | Bortoli | B64D 41/007 | 416/170 R |
| 2012/0269634 A1 * | 10/2012 | Bortoli | B64D 41/007 | 416/170 R |
| 2012/0328436 A1 * | 12/2012 | Soidel | B64D 41/007 | 416/47 |
| 2013/0259683 A1 | 10/2013 | Russ | | |
| 2013/0260940 A1 | 10/2013 | Lemmers | | |
| 2014/0070049 A1 * | 3/2014 | Russ | B64D 41/007 | 244/58 |
| 2015/0232194 A1 | 8/2015 | Bannon | | |
| 2016/0122034 A1 * | 5/2016 | Bortoli | B64D 41/007 | 416/142 |
| 2016/0146035 A1 | 5/2016 | Larson et al. | | |
| 2017/0158344 A1 * | 6/2017 | Janisiow | F16H 25/18 | |
| 2017/0191559 A1 | 7/2017 | Russ | | |
| 2018/0149091 A1 * | 5/2018 | Howell | F02C 7/32 | |

\* cited by examiner

HYBRID RAM AIR TURBINE WITH IN-LINE HYDRAULIC PUMP AND GENERATOR

TECHNICAL FIELD

The present disclosure relates generally to hybrid ram air turbines, and more particularly to a hybrid ram air turbine having a hydraulic pump in-line with an electric generator.

BACKGROUND

Ram air turbines (RATs) are commonly used on modern aircraft to provide a secondary or emergency power source in the event the primary power source is insufficient or fails. A typical ram air turbine includes a turbine that remains internal to the aircraft body until additional power is needed. When additional power is required, the RAT receives a deployment signal that releases stored energy contained within a deployment actuator. The force from the actuator opens a door(s) in the aircraft fuselage, deploying the ram air turbine into the freestream air adjacent to the aircraft. The turbine is rotated by the freestream air and the rotational torque from the turbine is transferred through a drivetrain to be converted into electric power by a generator. The rotation from the ram air turbine may also be used to drive a hydraulic pump. Ram air turbines utilizing both an electric generator and a hydraulic pump are referred to as hybrid ram air turbines. Some existing hybrid ram air turbines connect the drive train to a multi-output gear set that simultaneously drives the hydraulic pump and the generator off of the drive shaft. In alternative hybrid ram air turbines, a single shaft can be utilized to directly drive both the hydraulic pump and the generator.

When deployed, the ram air turbine must be spaced apart from the body of the aircraft by a sufficient margin to ensure that the turbine blades don't contact the aircraft body, or otherwise interfere with the aircraft body. In some examples, ram air turbines ensure that the turbine is sufficiently spaced apart by including a spacer strut between the generator and/or the hydraulic pump and the turbine portion of the ram air turbine. In existing hybrid ram air turbine configurations, the hydraulic pump and the electric generator are mounted at one end of the strut, while the turbine portion is mounted at the other end of the strut, opposite the generator and the hydraulic pump. The spacer strut structurally supports the turbine portion, relative to the aircraft as well as providing additional clearance.

SUMMARY OF THE INVENTION

In one exemplary embodiment a hybrid ram air turbine assembly includes a turbine portion including a plurality of turbine blades connected to a turbine shaft via a hub, a pivot joint connected to the turbine portion by a hydraulic pump and an electric generator, wherein the hydraulic pump and the electric generator are in-line with each other, and wherein the turbine shaft is connected to a generator input shaft via a first gear set.

In another example of the above described hybrid ram air turbine assembly a rotational output of the electric generator is connected to a rotational input of the hydraulic pump via a connector.

In another example of any of the above described hybrid ram air turbine assemblies the connector is a second gear set.

In another example of any of the above described hybrid ram air turbine assemblies the second gear set is a multi-speed planetary gear.

In another example of any of the above described hybrid ram air turbine assemblies the second gear set is controllably coupled to a ram air turbine controller.

In another example of any of the above described hybrid ram air turbine assemblies the second gear set includes at least one speed that steps up from the rotational output of the electric generator to the rotational input of the hydraulic pump.

In another example of any of the above described hybrid ram air turbine assemblies the second gear set includes at least one speed that steps down from the rotational output of the electric generator to the rotational input of the hydraulic pump.

In another example of any of the above described hybrid ram air turbine assemblies the connector is a direct mechanical connection.

In another example of any of the above described hybrid ram air turbine assemblies the hydraulic pump and the electric generator are a spacer support for the turbine portion and define a spacing length of at least a rotational clearance length of each blade in the plurality of turbine blades.

In another example of any of the above described hybrid ram air turbine assemblies the electric generator has a diameter to axial length ratio in the range of 1:2 to 1:6.

In one exemplary embodiment a hybrid ram air turbine assembly includes a turbine portion including a plurality of turbine blades connected to a turbine shaft via a hub, an electric generator including an input shaft connected to the turbine shaft via a first gear set, and including a generator output shaft, a hydraulic pump having an input shaft connected to the generator output shaft via a connector, wherein the hydraulic pump is in line with the generator, and a pivot joint connected to the hydraulic pump and configured to connect the hybrid ram air turbine assembly to an aircraft.

In another example of the above described hybrid ram air turbine assembly the connector is a planetary gear set.

In another example of any of the above described hybrid ram air turbine assemblies the planetary gear set is a multi-speed planetary gear set.

In another example of any of the above described hybrid ram air turbine assemblies the hydraulic pump and the generator structurally support the turbine portion relative to the pivot joint.

Another example of any of the above described hybrid ram air turbine assemblies further includes a controller controllably coupled to at least one of the first gear set and the connector.

In another example of any of the above described hybrid ram air turbine assemblies a combine length of the electric generator and the hydraulic pump, along an axis defined by the electric generator, is at least a rotational clearance length of each turbine blade in the plurality of turbine blades.

In another example of any of the above described hybrid ram air turbine assemblies the electric generator has a diameter to axial length ratio in the range of 1:2 to 1:6.

An exemplary method for supporting a hybrid ram air turbine includes connecting a pivot joint to an aircraft, connecting the pivot joint to a turbine portion through a hydraulic pump and an electric generator, and providing rotational power to the hydraulic pump through the electric generator.

In another example of the above described exemplary method for supporting a hybrid ram air turbine connecting the pivot joint to the turbine portion through the hydraulic pump and the electric generator comprises placing the hydraulic pump and the electric generator in line with each other.

Another example of any of the above described exemplary methods for supporting a hybrid ram air turbine further includes connecting an output shaft of the electric generator to an input shaft of the hydraulic pump through a multi-speed planetary gear set.

These and other features of the present invention can be best understood from the following specification and drawings, the following of which is a brief description.

DETAILED DESCRIPTION OF AN EMBODIMENT

Figure 1:
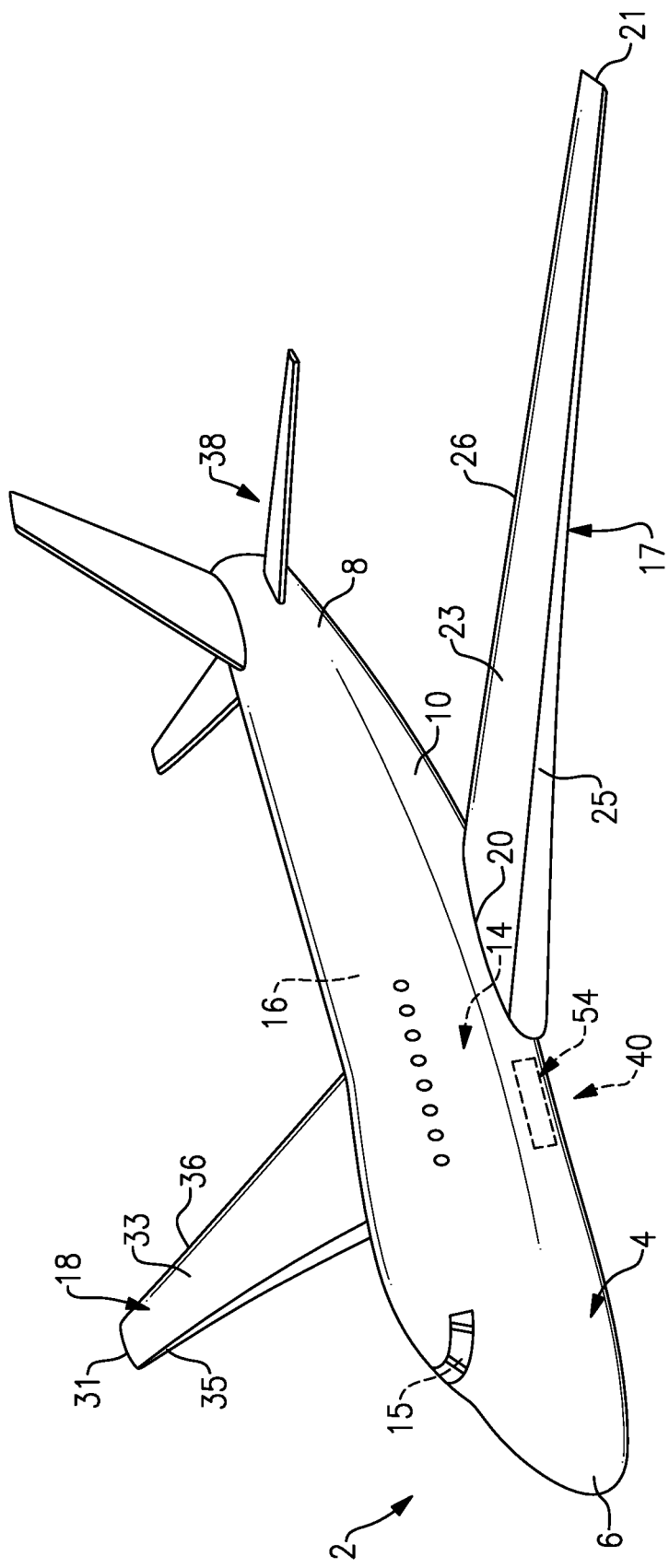
FIG. 1 schematically illustrates an exemplary aircraft including a ram air turbine assembly.

FIG. 1 schematically illustrates an exemplary aircraft 2, in accordance with an embodiment. The aircraft 2 includes a fuselage 4 extending from a nose portion 6 to a tail portion 8 through a body portion 10. The body portion 10 houses an aircraft cabin 14 that includes a crew compartment 15 and a passenger compartment 16. The body portion 10 supports a first wing 17 and a second wing 18. The first wing 17 extends from a first root portion 20 to a first tip portion 21 through a first airfoil portion 23. The first airfoil portion 23 includes a leading edge 25 and a trailing edge 26. The second wing 18 extends from a second root portion (not shown) to a second tip portion 31 through a second airfoil portion 33. The second airfoil portion 33 includes a leading edge 35 and a trailing edge 36. The tail portion 8 includes a stabilizer 38.

The aircraft 2 includes a ram air turbine (RAT) assembly 40 mounted within fuselage 4 or nose portion 6. When additional electric and/or hydraulic power is required by the aircraft 2, a compartment door 54 in the fuselage 4 opens deploying the ram air turbine assembly 40 into the freestream air flowing adjacent the body portion 10. One exemplary ram air turbine assembly 40 includes a hydraulic pump and an electric generator connected to a turbine portion. The hydraulic pump is in-line with the electric generator, and the combination of the hydraulic pump and the electric generator offsets the turbine portion from the aircraft body portion 10 sufficiently to allow blades of the turbine portion to rotate freely. Hydraulic pump is connected to the body of the aircraft 2 via any standard pivot connection. The turbine assembly includes a turbine and turbine shaft. A turbine shaft of the turbine assembly is mechanically connected to the generator via a gear set. As the turbine rotates, the rotational torque is transferred from the turbine shaft to the generator via the gear set.

Figure 2:
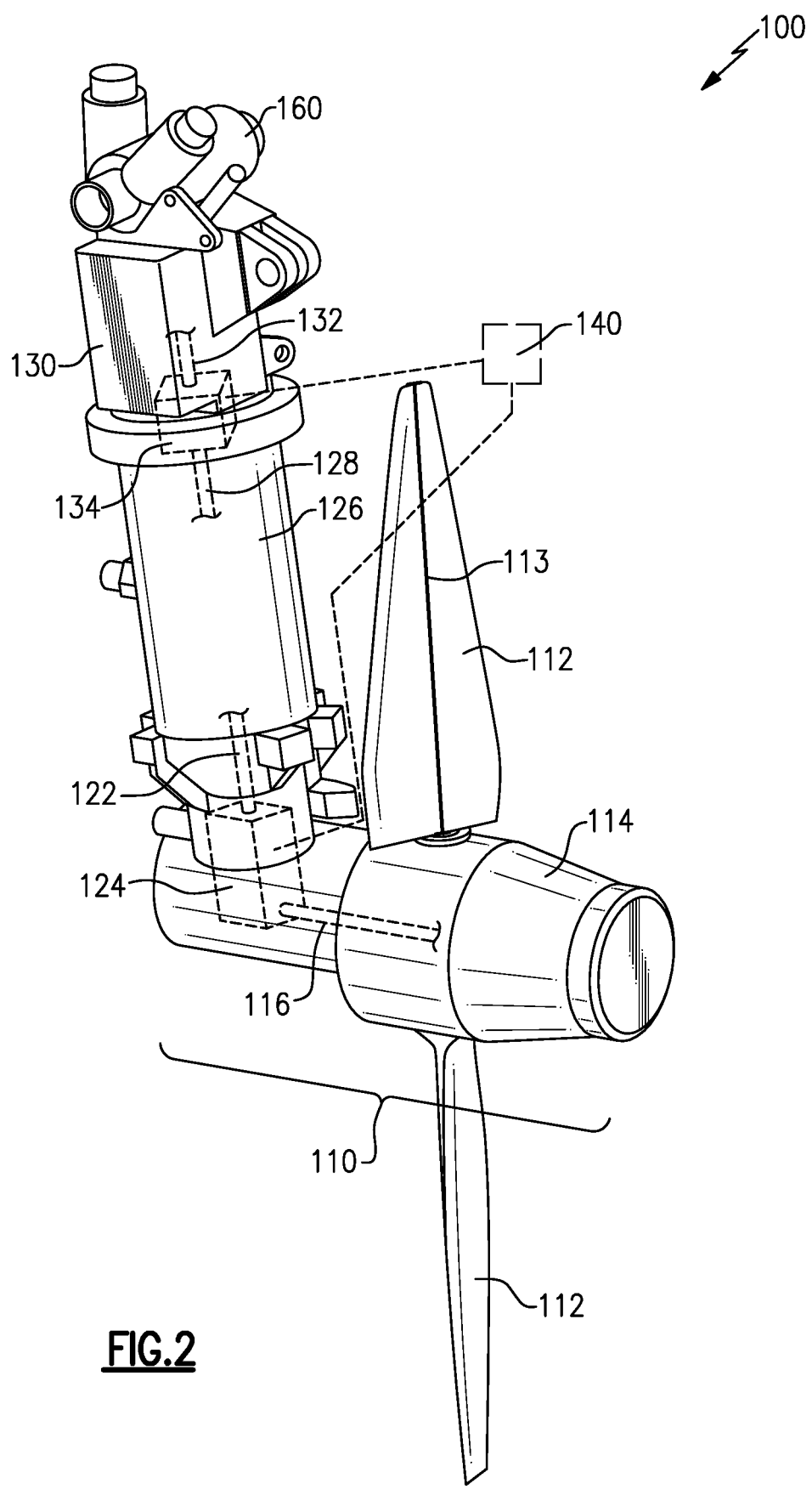
FIG. 2 schematically illustrates an exemplary ram air turbine assembly in a deployed configuration.
Figure 3:
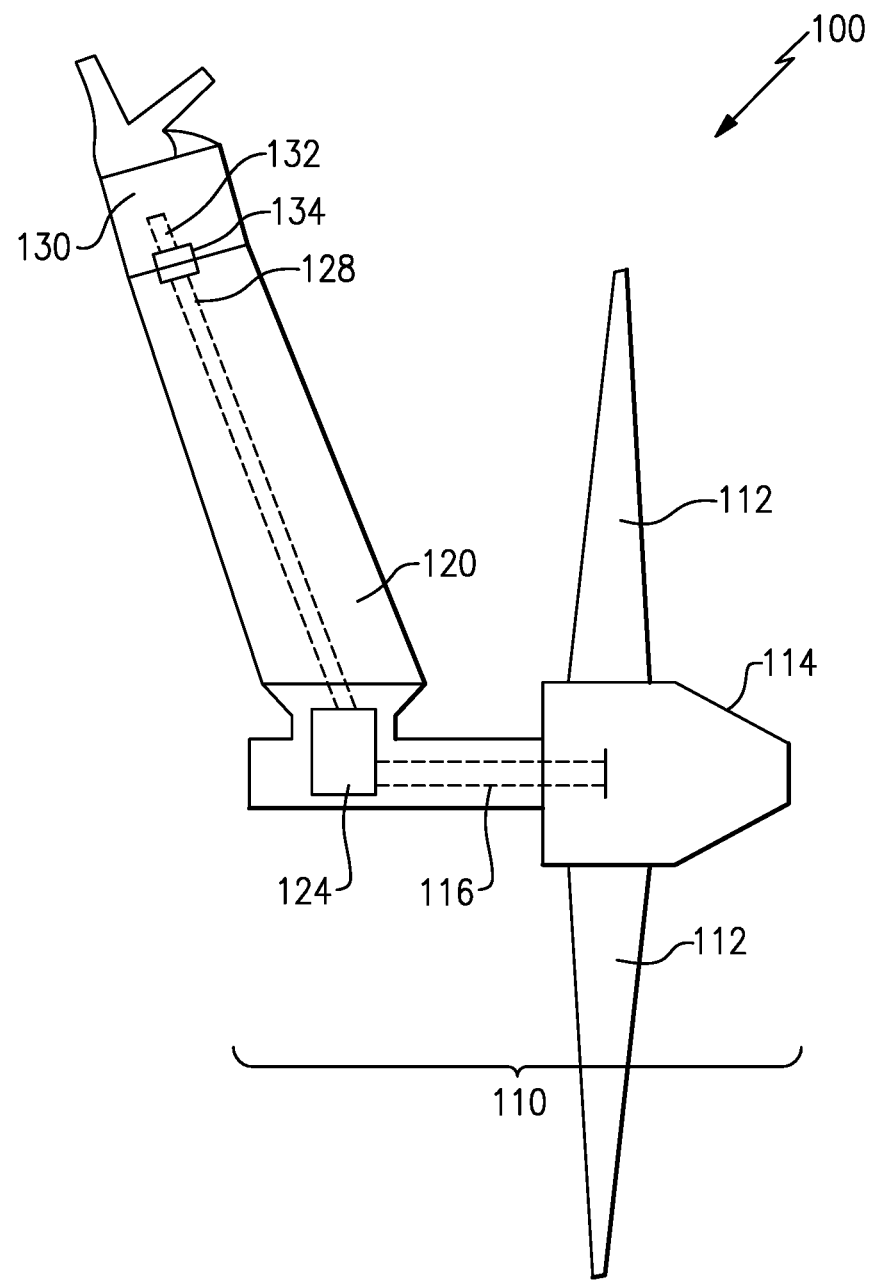
FIG. 3 schematically illustrates a cross section of the exemplary ram air turbine of FIG. 2 in the deployed configuration.

With continued reference to FIG. 1, FIG. 2 schematically illustrates an isometric view of an exemplary ram air turbine 100, including schematic illustrations of certain internal components. FIG. 3 schematically illustrates a cross section of the exemplary ram air turbine 100 of FIG. 2. The ram air turbine 100 includes a turbine portion 110 having multiple blades 112 protruding outward from a hub 114. Each blade 112 has a height 113 defined as the distance that the blade extends outward from the hub 114. The hub 114 is mechanically connected to a turbine shaft 116. When deployed, exposure of the blades 112 to the airstream surrounding the aircraft drives the blades 112 to rotate. Rotation of the blades 112 in turn drives the hub 114, and the connected shaft 116 to rotate. In order to ensure that the blades 112 can rotate freely, the turbine portion 110 must be spaced apart from the aircraft body by at least a rotational clearance length of the blade. In some examples, the rotational clearance length is a distance greater than the height 113 of the blades 112.

Mechanically connected to the turbine portion 110 is a first end of an electric generator 120. Mechanically connected to a second end of the electric generator 120, and in-line with the electric generator 120 is a hydraulic pump 130. The hydraulic pump 130 is connected to an opposite end of the electric generator 120 as the turbine portion 110. The length of the electric generator 120 and the hydraulic pump 130 combined provides sufficient clearance that the blades 112 can rotate freely without interfering with the body of the aircraft deploying the ram air turbine 100 and without requiring additional spacers.

A generator shaft 122 is connected to the turbine shaft 116 via a gear set 124. The generator shaft 122 provides a rotational input to the electric generator 120, and drives rotation of the internal generator components, thereby facilitating the generation of electric power according to known generator techniques. In some examples, such as the example illustrated in the cross section of FIG. 3, the generator shaft 122 can be a single shaft that extends an entire axial length of the electric generator 120 and provides an output shaft at an end of the electric generator 120. In alternative examples, the generator shaft 122 can be connected to the output shaft 128 through internal generator components, depending on the type of electric generator 120 utilized. The utilization of the generator shaft 122 to provide rotational motion from the turbine shaft 116 to the hydraulic pump 130 is referred to as the hydraulic pump 130 being in line with the electric generator 120.

In some examples, the gear set 124 is a single speed step up or step down gear set that translates a first rotational speed of the turbine shaft 116 into a directly corresponding second rotational speed of the generator shaft 122. This is referred to as having a single speed. In alternative examples, the gear set 124 can be a multi-speed gear set, with the specific step up or step down ratio being controlled among multiple possible options by a corresponding ram air turbine controller 140. In yet further examples, the gear set 124 can have a 1:1 speed ratio, and merely facilitate translating the rotation of the turbine shaft 116 to the generator shaft 122. While illustrated schematically as a single controller 140 outside of the ram air turbine 100, it should be appreciated that the controller 140 can be a dedicated ram air turbine controller, a general controller, or a combination thereof. Further, it should be appreciated that the controller 140 can be physically disposed in the aircraft body, the ram air turbine, or any other appropriate location.

A generator output shaft 128 protrudes from the electric generator 120 at the second end and is received by a connector 134. A hydraulic pump 130 includes a rotational input shaft 132 that is connected to the generator output shaft 128 via the connector 134. The hydraulic pump accepts the rotational input and converts the rotational input into hydraulic pressure according to any known hydraulic pump technique. In some examples, the connector 134 can be a direct mechanical connection and/or a 1:1 gear connection allowing for translation of rotation within the electric generator 120 to a rotational input at the hydraulic pump 130 without incurring a rotational speed change.

In alternative examples, the connector 134 can be a gear set, such as a planetary gear set, and allow for either a step up or a step down of the rotational speed of the rotational input 132 to the hydraulic pump, relative to the rotational output shaft 128 of the electric generator 120. In yet further examples, the planetary gear set can be a multi-speed gear set allowing for the controller 140 to control the ratio of input rotational speed to output rotational speed at the planetary gear set. In any example, the connector 134 translates rotational motion from the output shaft of the electric generator 120 to rotation of the input shaft for the hydraulic pump 130.

Utilization of the electric generator 120 to provide rotation from the turbine portion 110 to the hydraulic pump 130 in the ram air turbine is referred to herein as the hydraulic pump being in-line with the electric generator 120. In contrast, existing systems typically utilize a drive shaft disposed in a spacer strut to provide rotational power from the turbine shaft to both the electric generator and the hydraulic pump in a hybrid ram air turbine.

In addition to transferring rotational power from the turbine shaft 116 to the hydraulic pump 130 through the electric generator 120, the example configuration of FIGS. 2 and 3 provides structural support, and spacing, to the turbine portion 110. By placing the electric generator 120 and the hydraulic pump 130 in line with each other, the turbine portion 110 is spaced apart from the aircraft body by a distance larger than the distance of the turbine blades 112, even though neither the electric generator 120, nor the hydraulic pump 130, is of sufficient length alone to ensure such spacing. As such, this configuration enables the electric generator 120 and the hydraulic pump 130 to operate as the strut.

In order to ensure sufficient length, and spacing, the electric generator 120 that is utilized in the illustrated configuration of FIGS. 2 and 3 is longer than traditional ram air turbine generators. The utilization of a longer generator reduces the diameter necessary to provide the desired output, and reduces the inertia of the rotating generator 120. Reduction of the inertia, in turn, minimizes a torque required on the turbine in order to start up the generator rotation, thereby minimizing the length of time between deployment of the ram air turbine and provision of power from the electric generator 120. The smaller generator size can be expressed as a ratio of the diameter of the electric generator 120 to the axial length of the electric generator 120. In one exemplary embodiment of the configuration shown in FIGS. 2 and 3, this ratio is in the range of 1:2 to 1:6.

In one exemplary embodiment, the connector 134 is a planetary gear set, as described above, and is connected to the controller 140. The controller can be a ram air turbine controller, a general aircraft controller, or a set of electric controllers operating in conjunction. By incorporating a controller 140, the gear set 134 can be adjusted between speed change settings depending on the specific needs of the hydraulic pump 130 and the electric generator 120.

By configuring the hydraulic pump 130, and the electric generator 120 in line and between a pivot joint 160 and the turbine portion 110, the additional strut and the drive shaft contained within the strut of existing ram air turbine configurations can be omitted entirely. The omission of the strut and the drive shaft further reduces the packaging size of the ram air turbine 100 and the weight of the ram air turbine 100. Further, the utilization of an electric generator 120 having a smaller diameter to length ratio allows for better balance of the rotating components within the electric generator 120 and can increase the speed at which the electric generator 120 is able to rotate.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A hybrid ram air turbine assembly comprising:
    a turbine portion including a plurality of turbine blades connected to a turbine shaft via a hub;
    an electric generator including an input shaft connected to the turbine shaft via a first gear set, and including a generator output shaft;
    a hydraulic pump having an input shaft connected to the generator output shaft via a second gear set, wherein the hydraulic pump is in line with the generator and the second gear set is a multi-speed planetary gear; and
    a pivot joint connected to the hydraulic pump and configured to connect the hybrid ram air turbine assembly to an aircraft.

2. The hybrid ram air turbine of claim 1, wherein the second gear set is controllably coupled to a ram air turbine controller.

3. The hybrid ram air turbine of claim 1, wherein the second gear set includes at least one speed that steps up from the rotational output of the electric generator to the rotational input of the hydraulic pump.

4. The hybrid ram air turbine of claim 1, wherein the second gear set includes at least one speed that steps down from the rotational output of the electric generator to the rotational input of the hydraulic pump.

5. The hybrid ram air turbine of claim 1, wherein the hydraulic pump and the electric generator are a spacer support for the turbine portion and define a spacing length of at least a rotational clearance length of each blade in the plurality of turbine blades.

6. The hybrid ram air turbine of claim 1, wherein the electric generator has a diameter to axial length ratio in the range of 1:2 to 1:6.

7. A hybrid ram air turbine assembly comprising:
    a turbine portion including a plurality of turbine blades connected to a turbine shaft via a hub;
    an electric generator including an input shaft connected to the turbine shaft via a first gear set, and including a generator output shaft;
    a hydraulic pump having an input shaft connected to the generator output shaft via a second gear set, wherein the hydraulic pump is in line with the generator and the second gear set is a planetary gear set; and
    a pivot joint connected to the hydraulic pump and configured to connect the hybrid ram air turbine assembly to an aircraft.

8. The hybrid ram air turbine assembly of claim 7, wherein the planetary gear set is a multi-speed planetary gear set.

9. The hybrid ram air turbine assembly of claim 7, wherein the hydraulic pump and the generator structurally support the turbine portion relative to the pivot joint.

10. The hybrid ram air turbine assembly of claim 7, wherein a combined length of the electric generator and the hydraulic pump, along an axis defined by the electric generator, is at least a rotational clearance length of each turbine blade in the plurality of turbine blades.

11. The hybrid ram air turbine assembly of claim 7, wherein the electric generator has a diameter to axial length ratio in the range of 1:2 to 1:6.

12. A hybrid ram air turbine assembly comprising:
- a turbine portion including a plurality of turbine blades connected to a turbine shaft via a hub;
- an electric generator including an input shaft connected to the turbine shaft via a first gear set, and including a generator output shaft;
- a hydraulic pump having an input shaft connected to the generator output shaft via a connector, wherein the hydraulic pump is in line with the generator; and
- a pivot joint connected to the hydraulic pump and configured to connect the hybrid ram air turbine assembly to an aircraft; and
- a controller controllably coupled to at least one of the first gear set and the connector.

13. A method for supporting a hybrid ram air turbine comprising:
- connecting a pivot joint to an aircraft;
- connecting the pivot joint to a turbine portion through a hydraulic pump and an electric generator, wherein a rotational output of the electric generator is connected to a rotational input of the hydraulic pump via a second gear set;
- connecting an output shaft of the electric generator to an input shaft of the hydraulic pump through a multi-speed planetary gear set; and
- providing rotational power to the hydraulic pump through the electric generator.

14. The method of claim 13, wherein connecting the pivot joint to the turbine portion through the hydraulic pump and the electric generator comprises placing the hydraulic pump and the electric generator in line with each other.

* * * * *